United States Patent [19]

Hunter

[11] Patent Number: 4,647,005
[45] Date of Patent: Mar. 3, 1987

[54] BLOWOUT PROTECTOR

[76] Inventor: Joseph M. Hunter, 4080 Scio Rd. SW., Carrollton, Ohio 44615

[21] Appl. No.: 753,876

[22] Filed: Jul. 11, 1985

[51] Int. Cl.$^4$ .................... F16K 31/122; F16K 3/00; E21B 33/06
[52] U.S. Cl. ................................. 251/63; 251/172; 251/175; 251/193; 251/327
[58] Field of Search ............. 251/63, 172, 175, 193, 251/195, 326, 327, 328, 329, 1.1, 1.2, 1.3

[56] References Cited

U.S. PATENT DOCUMENTS

| | | | |
|---|---|---|---|
| 1,153,973 | 9/1915 | Tacit et al. | 251/63 |
| 2,726,842 | 12/1955 | Seamark | 251/172 |
| 3,367,625 | 2/1968 | Fortune | 251/172 |
| 3,463,193 | 8/1969 | Yost | 251/326 X |
| 4,078,579 | 3/1978 | Bucko, Sr. | 137/625.48 |

FOREIGN PATENT DOCUMENTS

| | | | |
|---|---|---|---|
| 713936 | 7/1965 | Canada | 251/172 |
| 2829400 | 3/1979 | Fed. Rep. of Germany | 251/175 |

Primary Examiner—Alan Cohan
Assistant Examiner—John S. Starsiak, Jr.
Attorney, Agent, or Firm—Harvey B. Jacobson

[57] ABSTRACT

A blowout protector for use between sections of well tubing at a well head comprises a flat rectangular housing having top and bottom plates with aligned openings connected to the respective tubing sections, the housing defining an internal chamber. A closure plate is movable piston-wise within the chamber between respective terminal positions at opposite ends of the chamber. The closure plate has an opening therein which aligns with the respective openings in the top and bottom plates when the closure plate is in one terminal position in order to allow well fluid to flow through the protector. In the other terminal position the closure plate forms a barrier to fluid flow through the housing. Fluid pressure inlet and exhaust ports are provided at opposite ends of the housing for moving the closure plate between its respective positions. The housing also incorporates pressure seals for the closure plates and means for automatically increasing the pressure exerted by one of the seals on the closure plate when the closure plate is in flow-blocking position.

4 Claims, 4 Drawing Figures

BLOWOUT PROTECTOR

BACKGROUND AND SUMMARY OF THE INVENTION

This invention relates to a blowout protector for use in oil well tubing at a well head and the like.

Included among objects of the invention are the provision of a simple, safe and versatile blowout protector which provides an effective seal against blowouts; which can be operated from a safe remote location using air pressure, bottled gas, hydraulic pressure or the like; which is quick closing and of compact size; which can be used by service rigs or workover rigs for added safety; which is of simple construction for easy maintenance and economy of manufacture; and which has a minimum of moving parts for reliable operation.

In accordance with the invention, a blowout protector comprises a flatish box-like housing having top and bottom plates, and end and side plates defining a sealed internal chamber, aligned openings in the top and bottom plates for connection to well tubing, a closure plate slidable piston-wise in said chamber between respective open and closed positions toward respective ends of the chamber, the closure plate having an opening formed therethrough adapted to align with the openings in the top and bottom plates when the closure plate is in the open position to allow well fluid to flow through the tubing, the closure plate forming a barrier to flow through the tubing when in the closed position, and the housing including fluid pressure inlet and outlet ports at opposite ends of the housing for the introduction and exhaust of pressure fluid to and from the chamber to move the closure plate piston-wise between the open and closed positions.

Preferably, the top and bottom plates are provided with internal annular seals around the respective openings to seal against the upper and lower faces of the closure plate and duct means may be provided in the housing and through the closure plate to pressurize at least one of the seals (the one on the high pressure side of the housing) in the closed position of the closure plate to provide additional protection against escape of well fluids. The closure plate itself may also be provided with ring or lip-type seals at its respective ends.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
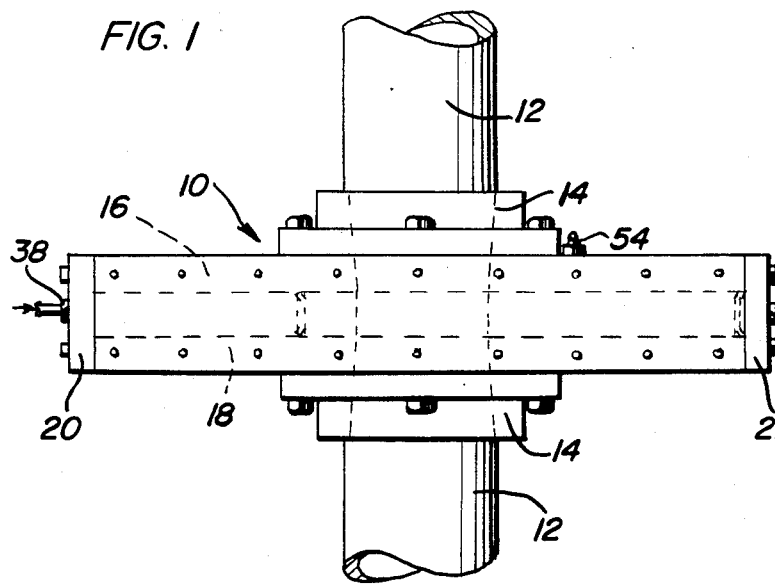
FIG. 1 is a side elevational view of a blowout protector in accordance with the invention installed between sections of well tubing.
Figure 2:
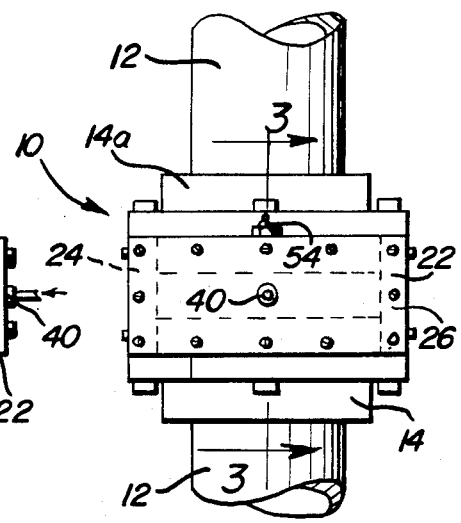
FIG. 2 is an end view of the blowout protector.

A blowout protector 10 in accordance with the invention is shown installed between sections of well tubing 12, 12a at a well head or the like, by means of flanged adaptors 14, 14a, it being understood that the blowout protector is used in the usual way for rapidly shuting off the tubing in case of a well blowout and the like.

The blowout protector comprises a generally flatish rectangular box-like housing having a top plate 16, a bottom plate 18, end plates 20, 22, and side plates 24, 26. The plates are bolted together with suitably interposed sealing gaskets or the like (not shown) so as to define a flat rectangular internal chamber 28. The top and bottom plates have aligned, centrally disposed openings 30, 32 suitably adapted to the diameter of the well tubing, so as to define a flow passage through the housing between the tubing sections.

Figure 3:
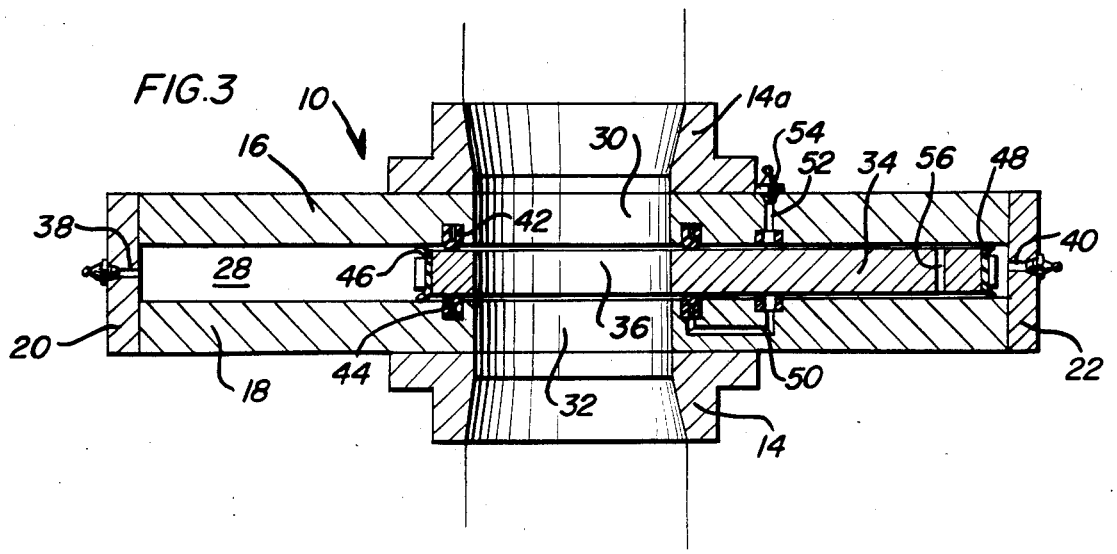
FIG. 3 is an enlarged sectional view on line 3—3 of FIG. 2.
Figure 4:
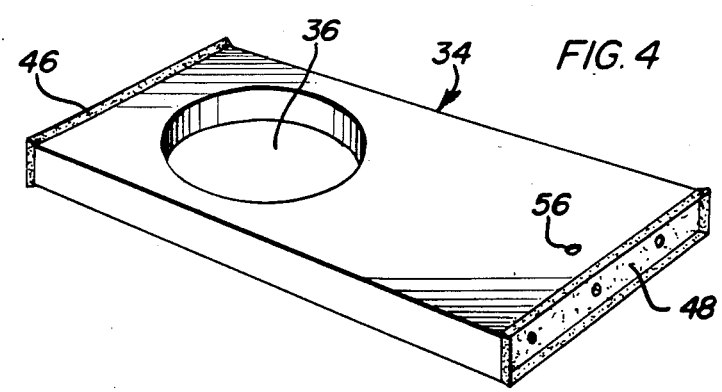
FIG. 4 is a perspective view of a closure plate used in the blowout protector.

A closure plate 34 (FIG. 4) is located piston-wise in chamber 28 for sliding movement between the end plates 20, 22, as will be described. Plate 34 has an opening 36 toward one end thereof conforming in diameter substantially with openings 30, 32, and adapted to align with the latter when the closure plate is in open position at one end of the chamber 28, as shown in FIG. 3, which is the normal position of the plate when the well is producing, whereby well fluid can flow through the protector. When, however, it is necessary to seal the well, plate 34 is moved to the other end of chamber 28, moving opening 36 out of register with openings 30, 32 and forming a barrier to flow through the tubing. To provide for movement of the closure plate between the respective open and closed positions, the end plates of the housing are provided with respective pressure-fluid inlet and exhaust ports 38, 40. (When the closure plate is moved from open to closed, port 40 is the inlet port and port 38 is the exhaust port. When the plate is to be moved from closed to open position, the ports are reversed.) As noted above, any convenient source of pressure fluid may be used for moving the closure plate.

Annular horseshoe-section urethane or like seals 42, 44 are provided around the respective openings 30, 32 for sealing against the upper and lower faces of the closure plate, and the closure plate is itself provided with ring-like urethane lip seals 46, 48 or the like at its respective ends. Further, means is provided for automatically exerting fluid pressure under seal 44 (which is on the high pressure side of the housing) to press it more tightly into engagement with the bottom face of the closure plate when the plate is closed, thereby further insuring against leakage of well fluid. Such means comprises a duct 50 for pressure fluid formed in plate 18, and aligned duct 52 in plate 16 extending from a pressurized fluid connector 54 (connected, in use to a suitable source of pressure fluid,) and a through-duct 56 in closure plate 34 which aligns with ducts 50 and 52 when the closure plate is in closed position.

It will be seen that the blowout protector is quick-acting in closing off a well or the like, is adequately sealed, and has only a single moving part, namely the closure plate, that has to move only a small distance to seal the well. The housing top and bottom plates can be machined to accept a variety of adaptors for flexibility in installing the device in a variety of well head situations. A small kill flange can be added to the bottom of the housing to control well pressure with fluids.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A blowout protector for use between sections of well tubing at a well head and the like comprising a housing having upper and lower plates with aligned openings for connection to the respective tubing sections, the housing defining a flatish internal chamber and including a closure plate shiftable within the chamber between respective terminal positions, the closure plate including an opening formed therethrough aligned with the openings in the upper and lower plates in one terminal position to allow fluid flow through the housing, the closure plate in the other terminal position effectively forming a barrier to flow through the housing between the openings in the top and bottom plates, said housing and closure plate including coacting closure plate shifting means effective to shift the closure plate between the respective terminal positions, the protector including sealing means for the closure plate comprising annular seals in the respective upper and lower plates of the housing around the respective openings therein for sealing against respective upper and lower surfaces of the closure plate, said protector including means for automatically increasing pressure of one of the annular seals against the closure plate when the plate is in the terminal position blocking flow through the housing, the means for automatically increasing pressure including first and second ducts in the housing, one of said ducts leading to an underside of said one seal and the other of said ducts leading to a connection for a source of fluid pressure, and a third duct formed through the closure plate for alignment with the first and second ducts when the closure plate shifted to said terminal position so as to connect the underside of said one seal to the connection for a source of fluid pressure.

2. The invention of claim 1 wherein the sealing means further comprises ring-like seals on the closure plate.

3. The invention of claim 2 wherein the ring-like seals comprise lip-type seals at opposite ends of the closure plate.

4. A blowout protector for use between sections of well tubing at a well head and the like comprising a housing having opposite ends and upper and lower plates with aligned openings for connection to the respective tubing sections, the housing defining a flatish internal chamber and including a closure plate movable piston-wise within the chamber between respective terminal positions at opposite ends of the chamber, the closure plate including an opening formed therethrough adapted to align with the openings in the upper and lower plates in one terminal position to allow fluid flow through the housing, the closure plate in the other terminal position effectively forming a barrier to flow through the housing between the openings in the top and bottom plates, and the housing including port means at the respective ends thereof for the introduciton and exhaust of pressurized fluid effective to move the closure plate piston-wise between the respective terminal positions, the protector including sealing means for the closure plate comprising annular seals in the respective upper and lower plates of the housing around the respective openings therein for sealing against respective upper and lower surfaces of the closure plate wherein the protector includes means for automatically increasing pressure of one of said annular seals against the closure plate when the plate is in the terminal position blocking flow through the housing, and wherein the means for automatically increasing the pressure includes first and second ducts in the upper and lower plates of the housing respectively, one of said ducts leading to an underside of the seal and the other of said ducts leading to a connection for a source of fluid pressure, and a third duct formed through the closure plate for aligning with the first and second ducts when the closure plate is in said terminal position so as to connect the underside of the seal with the connection for a source of fluid pressure.

* * * * *